Oct. 7, 1941.  W. F. RIDGWAY  2,257,764
INDICATING MECHANISM
Original Filed July 23, 1937  3 Sheets-Sheet 1

INVENTOR
William F. Ridgway
By Parker, Carlson, Pitzner & Hubbard
ATTORNEYS

Oct. 7, 1941.  W. F. RIDGWAY  2,257,764
INDICATING MECHANISM
Original Filed July 23, 1937    3 Sheets-Sheet 2
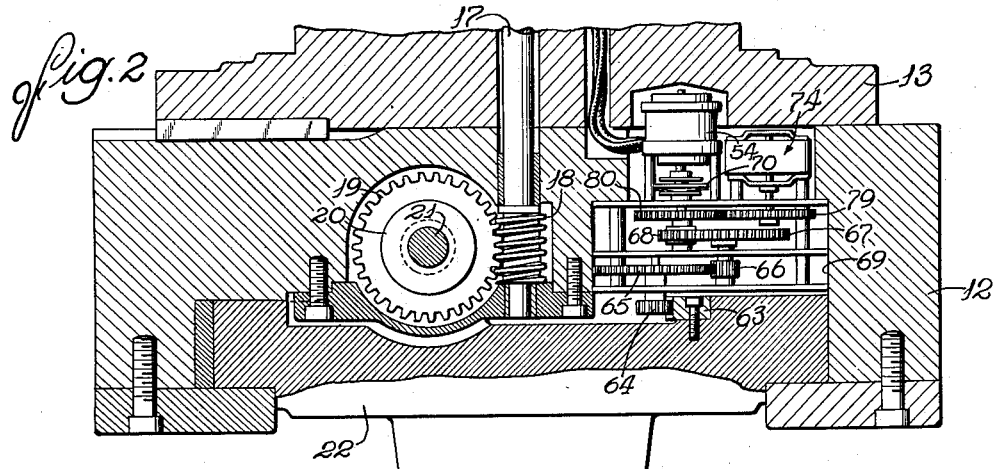
Fig. 2
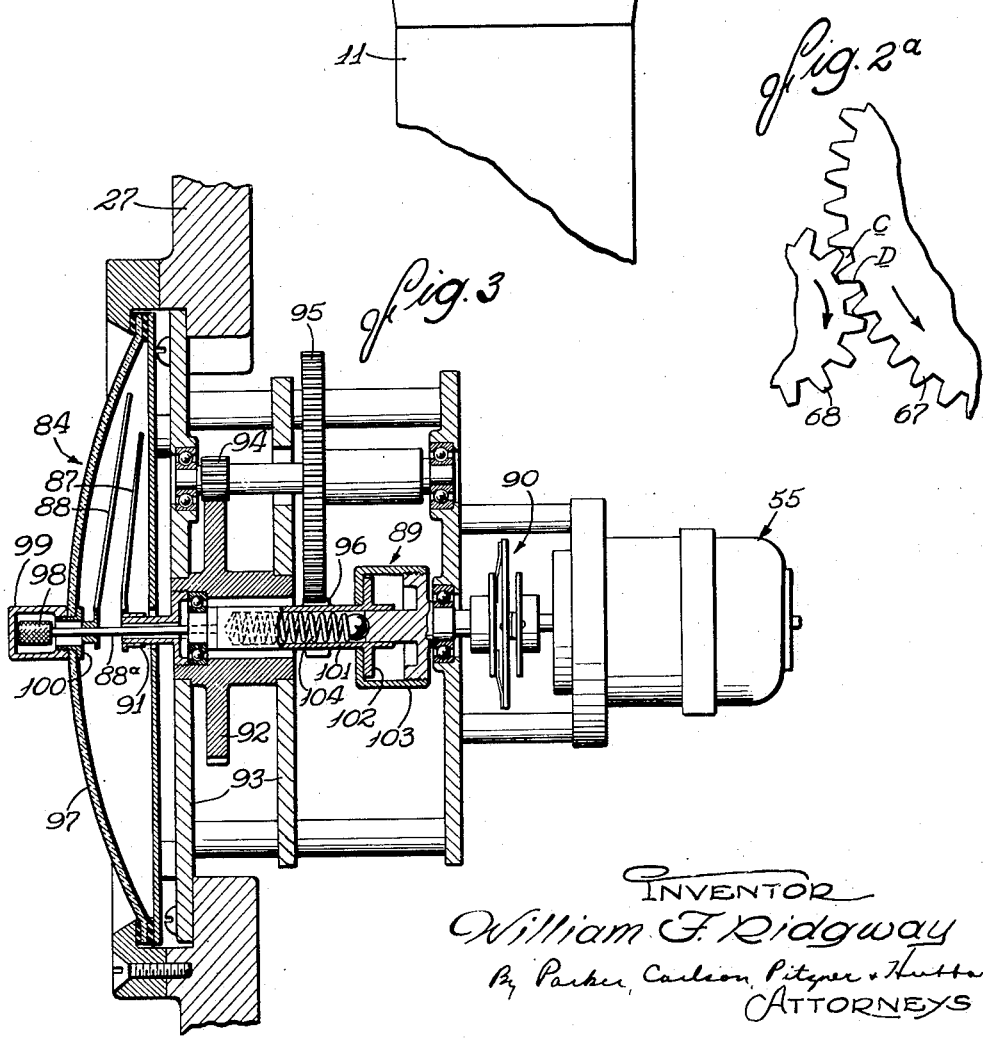
Fig. 2a
Fig. 3
INVENTOR
William F. Ridgway
By Parker, Carlson, Pitzner & Hubbard
ATTORNEYS Oct. 7, 1941.    W. F. RIDGWAY    2,257,764
INDICATING MECHANISM
Original Filed July 23, 1937    3 Sheets—Sheet 3

INVENTOR
William F. Ridgway
By Parker, Carlson, Pitzner & Hubbard
ATTORNEYS

Patented Oct. 7, 1941

2,257,764

UNITED STATES PATENT OFFICE 2,257,764

INDICATING MECHANISM

William F. Ridgway, Rockford, Ill., assignor to The Ingersoll Milling Machine Company, Rockford, Ill., a corporation of Illinois Original application July 23, 1937, Serial No. 155,209, now Patent No. 2,196,231, dated April 9, 1940. Divided and this application October 30, 1939, Serial No. 301,882

1 Claim. (Cl. 177—351)

The invention relates to mechanisms for measuring or indicating changes in the position of a movable machine tool element such as a work table, a tool head, or the like and by means of which such measurements may, if desired, be indicated at a point remote from the movable element. The present application is a division of my copending application Serial No. 155,209, filed July 23, 1937, now Patent Number 2,196,231, issued April 9, 1940.

One object of the present invention is to provide a system embodying an electrical transmitter and receiver for indicating at a remote point the position of a movable element, which is of such character that any error in the accuracy with which the receiver follows the transmitter will not be magnified in the readings of the indicator or measuring device at the receiving end of the system.

Other objects and advantages of the invention will become apparent from the following detailed description taken in connection with the accompanying drawings, in which—

Fig. 2 is an enlarged detail transverse sectional view along the line 2—2 in Fig. 1 illustrating particularly the construction of the indicator transmitter mechanism.

Fig. 2ª is an enlarged detail view of a portion of the gear train included in the mechanism of Fig. 2.

Figure 1:
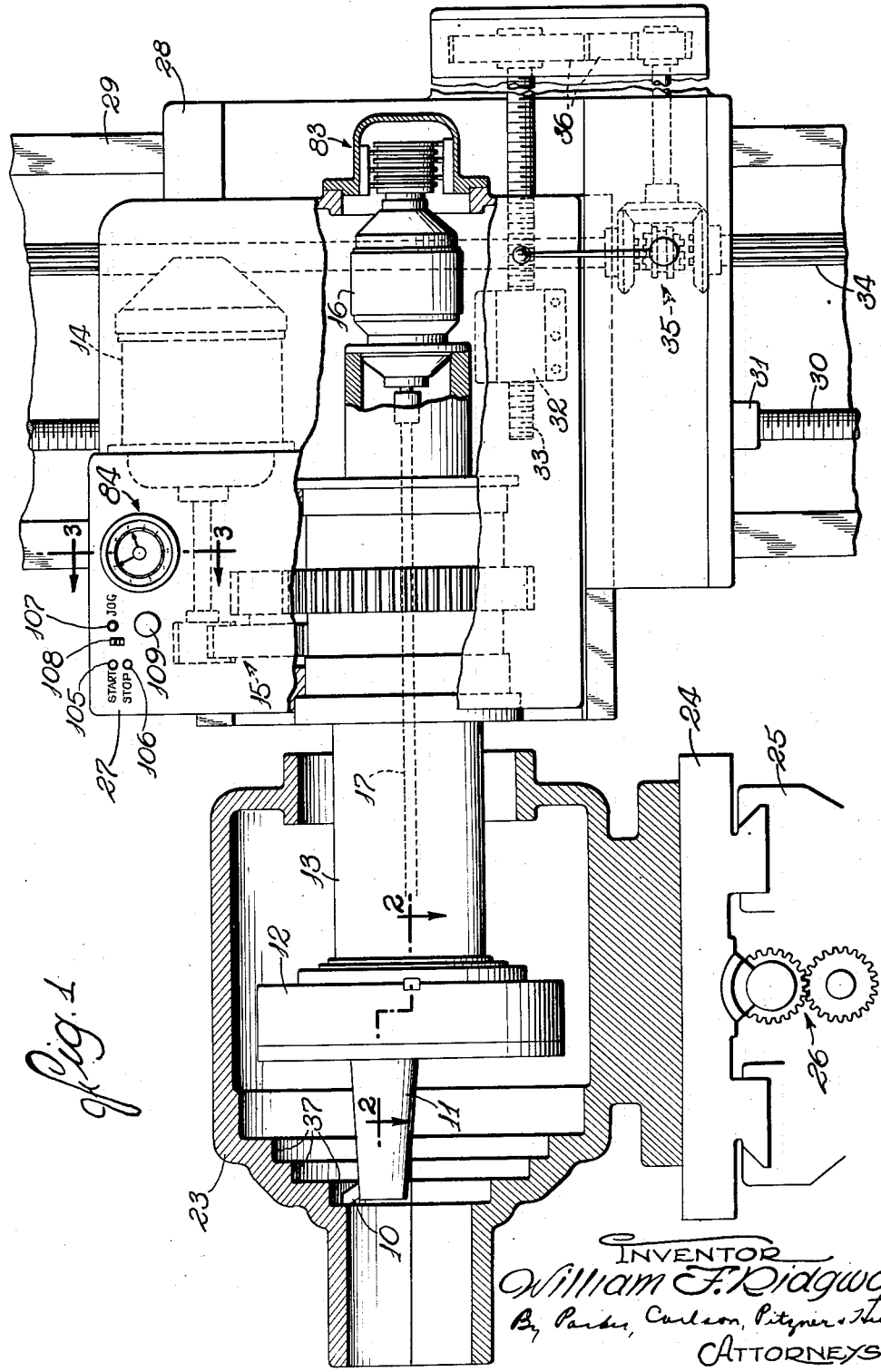
Figure 1 is a partial end elevation of a machine tool provided with an indicator mechanism embodying the invention, portions of the tool head assembly being broken away in order better to illustrate the interior construction thereof.

Fig. 3 is an enlarged detail vertical sectional view along the line 3—3 in Fig. 1 illustrating particularly the construction of the indicator receiver mechanism.

Figure 4:
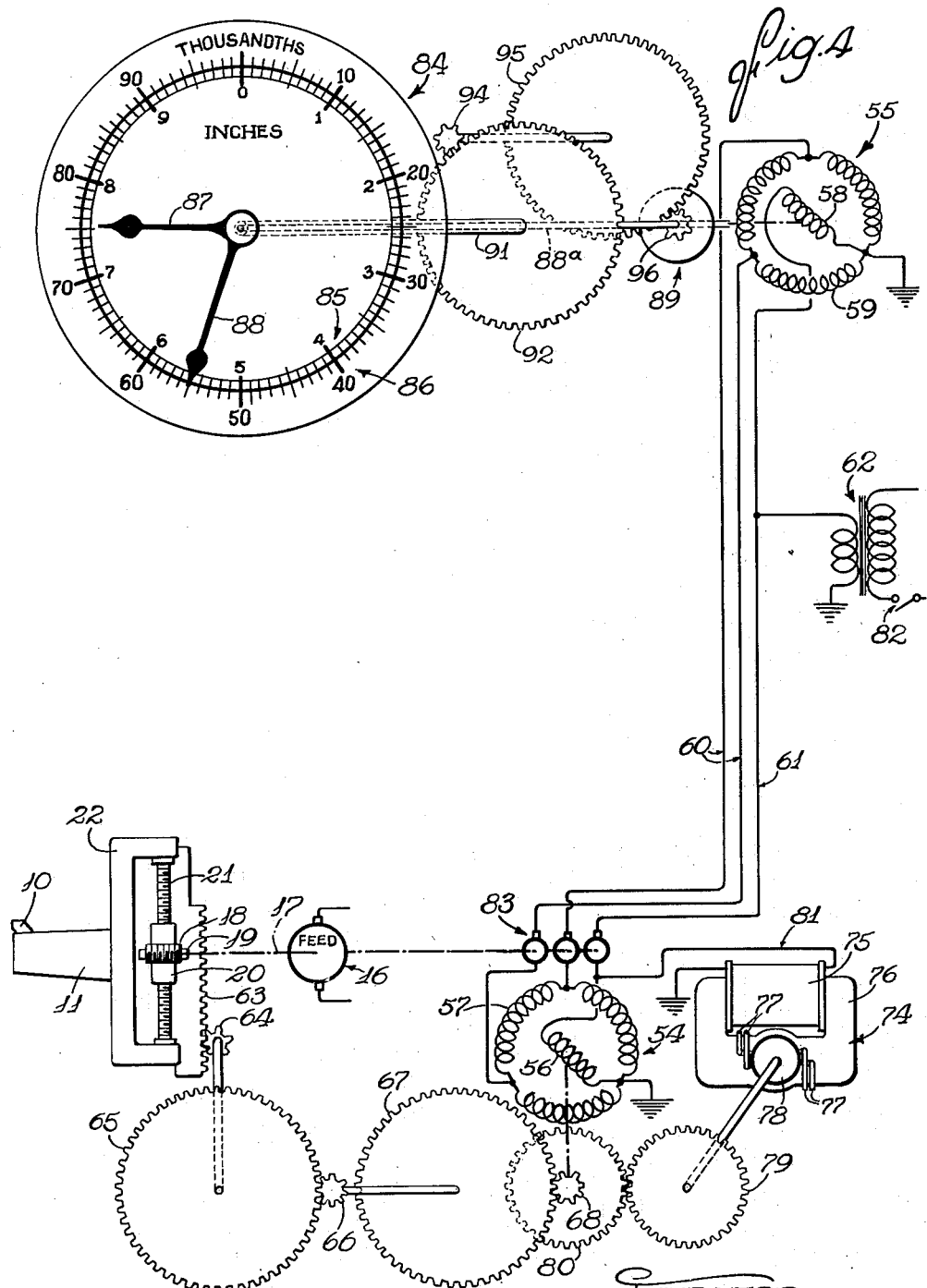

Fig. 4 is a schematic representation of the indicator mechanism as well as of the associated machine tool elements and control circuits therefor.

For purposes of illustration and exemplification of its various novel features, the invention has been shown herein as embodied in an indicating mechanism applied to an open-side boring and milling machine. It will be understood by those skilled in the art, however, that the invention is also applicable to a wide variety of other types of machine tools, and the appended claim is intended to cover all modifications and alternative constructions within the spirit and scope of the invention.

The illustrative indicating mechanism embodying the present invention has been shown herein as arranged to measure the radial displacement of a rotatable boring tool 10 (Fig. 1). This application of the indicating mechanism was chosen since the present mechanism is particularly suited for transmitting precision readings to an indicator remote from the movable element whose position is being measured, and such a boring tool, located as it frequently is in the interior of a work piece, is a prime example of the need for such a measuring instrument in the machine tool field. Before proceeding to a description of the indicator mechanism, however, a brief identification of the machine tool parts associated with it will be useful as a background.

In the machine shown in Fig. 1, the boring tool 10 is fixed on an arm 11 arranged to move transversely of the outer face of a tool head 12 which is fixed to the projecting end of a spindle 13. The spindle is rotated by an electric drive motor 14 connected through suitable gearing 15. The tool carrying arm 11 may, on the other hand, be adjusted transversely of the spindle axis, to vary the diameter of the cut formed by the tool 10, by means of a feed motor 16. This motor is connected through a shaft 17 projecting through the hollow spindle 13 and a worm wheel 18, 19 to a nut 20 fast on the worm wheel (Fig. 4). This nut is in turn threaded on a screw 21 fixed to a tool support or slide 22 which carries the arm 11 so that by rotation of the feed motor, the slide 22, and the tool which it carries, can be adjusted toward or away from the ram axis.

Three dimensional relative feeding movement is possible between the tool spindle 13 and a work piece 23 (Fig. 1) with the machine shown. For this purpose, the work piece is carried by a table 24 which is horizontally traversable on a bed 25 by means of a suitable power actuating mechanism (not shown) connected to the table through gearing 26. Horizontal axial motion of the spindle is accomplished by a corresponding feeding motion of a carriage 27 in which it is journaled, and vertical movement of the spindle is effected by a corresponding vertical movement of a saddle 28 on which the carriage 27 is slidable feed motor (not shown). Similarly, to trav- guide column 29, a lead screw 30, threaded in a fixed nut 31 on the saddle, is driven by a suitable feed motor (not shown). Similarly, to traverse the carriage 27, a nut 32 is fixed on it and in this nut is threaded a lead screw 33 driven from a spline shaft 34 through a reversing clutch 35 and gears 36. The spline shaft 34 is, of course, also driven by a suitable power actuating mechanism.

As was heretofore noted, the novel indicating mechanism herein contemplated has been shown as arranged to indicate the radial position of the tool 10. The use of such an indicator is particularly advantageous in machine tools of the type described since the metal removing tool may be disposed within the interior of a work piece such as the hollow casting 23 (Fig. 1) and by virtue of the indicating mechanism, it is possible to position the tool accurately for boring stepped recesses such as the recesses 37 without frequent withdrawals of the tool to locate the latter for each operation. In general, the indicating mechanism includes a transmitter, operatively connected to the tool support 22 and movable bodily with the spindle together with a receiver which is located at some remote point easily accessible to the operator and connected to a suitable visual indicator. Preferably, this indicator gives a continuous indication of the tool or tool support position.

The transmitter and receiver of the system noted above are self-synchronous electrical devices 54 and 55 respectively (Fig. 4). Each of these devices embodies relatively rotatable inductively related primary and secondary members 56—57 and 58—59 respectively. The secondary members 57 and 59 are preferably stationary and include distributed electrical windings having corresponding symmetrical polyphase terminals interconnected through a pair of conductors 60 and through a ground connection such as the machine tool structure. The rotatable primary members 56 and 58 are on the other hand provided with single-phase windings defining two definite poles and connected through a conductor 61 and a suitable ground connection to a common source of single-phase alternating current such as a transformer 62.

With such an arrangement, the primary members 56 and 58 of the transmitter and receiver are self-synchronizing. That is, when the primary member 56 of the transmitter is rotated, the primary member 58 of the receiver will be moved through a corresponding degree of angular adjustment in synchronism with the transmitter. The reason for this self-synchronous action is that the single-phase current in the transmitter primary 56 induces voltages in the three sections of the distributed primary winding 57 of the transmitter. These three voltages are not equal in magnitude and vary with the position of the rotor. When the transmitter and receiver rotors are in exactly corresponding positions, the voltages induced in the transmitter secondary winding 57 are exactly equal and opposite to those induced in the receiver secondary winding 59. In other words, they are balanced so that no current flows in the secondary windings. When the transmitter rotor is moved from its original position, however, the induced voltages are no longer equal and opposite and a current flows in the secondary windings. This current flow sets up a torque which tends to return the rotors to the synchronous position. Since the transmitter rotor is positively moved and held in position by its connection to some external member, the receiver rotor shifts to a position corresponding to the new position of the transmitter rotor. When the receiver rotor attains the new position, the secondary currents are again balanced so that no further torque is exerted on the rotors. Thus, whenever the transmitter rotor is moved, the receiver rotor immediately assumes a similar position.

In order to indicate extremely small movements of the tool support 22, for example, thousandths of an inch, and provide for transmission of these movements to a remote point of indication, an arrangement has been provided for shifting the transmitter rotor 56 through comparatively large angles for small increments of movement of the tool support. For this purpose, a speed-increasing gear train interposed between the tool support and transmitter rotor is adapted in the present instance to produce one revolution of the rotor shaft for one-tenth of an inch of movement of the tool support. As shown in Fig. 4, a rack 63 fixed to the tool support 22 meshes with a pinion 64 fast with a larger gear 65 which in turn meshes with a pinion 66 fast on a larger gear 67 meshing with a pinion 68 on the transmitter rotor shaft. This gear train is mounted within a suitable recess 69 formed in the tool head 12 (Fig. 2). It will be noted that the transmitter rotor 56 is connected to the pinion 68 through a flexible coupling 70 in order to minimize friction in the gear train which would otherwise result from any misalinement of the shafts.

With such a gear train connection between the machine tool element and the associated indicator transmitter, backlash in the gear train may cause inaccuracy in the operation of the indicator. In my copending application Serial No. 155,209 referred to above, a simple and effective arrangement has been described and claimed which is of general utility in indicating mechanisms for overcoming the difficulty noted. Since this same backlash take-up arrangement is desirably, though not necessarily, used in mechanisms embodying the present invention, it has been shown but not claimed herein and constitutes per se no part of the present invention. In the present instance, an electric motor, illustrated as a small shaded pole induction motor 74 (Fig. 4), is arranged to exert a unidirectional force or torque on the terminal gear of the train, which force is sufficient to take up any backlash or looseness in the motion-transmitting connection between the machine tool element and the indicator control member 56, but which is also insufficient to move the tool support 22. Thus, even though the gears and pinions of the gear train are not formed with a high degree of precision, the backlash take-up motor 74 effectively prevents relative movement therebetween.

The backlash take-up motor 74 illustrated includes a winding 75 surrounding a core 76 normally energized during operation of the machine tool and carrying shading rings 77 by which rotation of an induction-type rotor 78 is induced to produce a substantially constant torque in all positions of the motor shaft. A gear 79 on the motor rotor shaft meshes with a gear 80 of the train fast on the shaft of the pinion 68 and interposed between this pinion and the flexible connection 70. This connection of the motor 74 to the last element of the gear train renders it effective to take up the backlash in all of the gears and pinions of the train.

Energy is preferably supplied to the backlash take-up motor 74 from the same source of single-phase alternating current as the primary members 56 and 58 of the transmitter and receiver elements of the indicator mechanism. Thus, one terminal of the motor energizing winding 75 is connected to the secondary of the transformer 62 through conductors 81 and 61 while the other terminal of the winding is connected to the ground as, for example, through the machine tool structure. This arrangement of connections makes it possible to deenergize the motor 74 as well as the electrical transmitter and receiver by means of a single control switch 82 and as a result, the operator cannot neglect to shut-off the stalled motor 74 when cutting out the indicator mechanism. In addition, the arrangement of connections described simplifies the problem of providing electrical connections between the elements carried by the tool spindle 13 and the relatively movable carriage 27. For this latter purpose, three slip rings 83 (Figs. 1 and 4) coaxial with the spindle 13 and mounted on the inner end thereof complete the connections for conductors 60 and 61. Since the winding 75 of the motor 74 is energized through the conductor 61, no separate slip ring or slip rings are required for this motor and the use of the ground connections described also eliminates the necessity of two additional slip rings for the electrical indicator system terminals.

The receiving self-synchronous motor 55 is arranged to actuate a suitable visual indicator designated generally by the numeral 84 adapted to indicate the movements of the machine tool element 22 in primary units of linear measure (in the present instance inches) and also in thousandths of such units. This visual indicator is mounted at some point convenient to the operator as, for example, on the carriage 27 (Fig. 1) and in the present instance includes two concentric stationary scales 85 and 86 respectively graduated in inches and tenths thereof and in hundredths and thousandths of an inch. These scales coact with pointers 87 and 88.

In accordance with one aspect of the present invention, the needle or pointer 88 which registers the smallest increments, that is, thousandths, is arranged to rotate at the same speed as the rotor of the receiver motor 55. For this purpose, it is mounted on a shaft 88ª connected (Fig. 3) to the receiver rotor through a clutch, designated generally by the numeral 89, and a flexible connection 90.

A suitable speed reduction gearing is interposed between the inch-indicating pointer 87 and the receiver rotor. Thus, the needle 87 is secured to a sleeve 91 surrounding the shaft 88ª in spaced relation and threaded in a bore formed in the outer end of a hub of a gear 92 journaled in suitable supporting plates 93. This gear in turn meshes with a pinion 94 fast with respect to a gear 95 meshing with a second pinion 96. The latter pinion is fast on the driven member of the clutch 89.

It will be observed that with the motion transmitting mechanism above described, the motion of the machine tool element 22 is amplified before electrical transmission to the receiving motor 55 and that such amplification is such that the rotors 56 and 58 turn at the same speed as the pointer 88 by which the small increments are indicated. Therefore, any inaccuracy in the electrical transmission, which is on the order of one and one-half degrees with self-synchronous motors now available, will not be amplified before application to the pointer 88. As a result, the total error due to the electrical part of the system will be substantially less than one-thousandth of an inch. Moreover, since there is no gearing between the receiver rotor and the needle 88, there is no need to make provision for taking up backlash in the receiving portion of the motion transmitting connection.

Ready readjustment of the zero or other initial setting for the indicator pointers 87 and 88 is effected through the medium of the clutch 89. For this purpose, the shaft 88ª is extended through an aperture in a transparent bezel 97 which covers the indicator and a manual operating knob 98 is attached to its outer end. A cap 99 threaded on a bushing 100 serves to protect the operating knob from accidental contact.

When the shaft 88ª is shifted axially inward by the operator, a corresponding movement is effected of a tubular sleeve 101, which constitutes the driven member of the clutch 89. It will be seen that this sleeve is provided with a laterally projecting annular flange 102 frictionally engageable with the adjacent bottom wall of a cup-shaped member 103 fast on the shaft of the receiver 55. A helical spring 104 disposed within the sleeve 101 normally maintains the driving and driven members of the clutch in frictional engagement. After the clutch has been disengaged as described, the shaft 88ª is rotated, thereby directly moving the pointer 88 and correspondingly moving the pointer 87 through the associated gear train 92—94—95—96.

By providing for complete disconnection of the indicator 84 from the receiver rotor 58, any inadvertent shifting of the rotor 58 during resetting is obviated and the introduction of an otherwise possible error is avoided. The clutch, being of the friction type, always permits the clutch elements to come back into gripping engagement in the proper angular relation.

In the operation of the machine tool described, a work piece such as the hollow casting 23 (Fig. 1) is clamped on the work table 24 and the table is advanced to bring the work piece into alinement with the tool support. The spindle 13 is then elevated as required by the saddle 28 and projected by advancing the carriage 27 to bring the cutting tool 10 into operative relation with the work piece. In the event that a series of stepped circular recesses, such as the recesses 37, are to be bored, the rotating cutting tool 10 is first located at the axis of rotation and then fed outwardly by the feed motor 16 in the usual manner to effect the desired boring or face milling operation. In order to increase the ease of manipulation and control of the machine, the feed motor 16 is preferably arranged to be controlled by means of a group of control devices adjacent the indicator 84 (Fig. 1) and including, for example, "start" and "stop" switches 105, 106, a jog switch 107, a direction selector switch 108, and a speed controller operable by a knob 109. The operator is thus able to gauge the progress of the work by means of the visual indicator and to control the location of the cutting tool with great nicety.

I claim as my invention:

In a system for indicating at a point remote from the element the movements of a movable element in very small increments such as thousandths of a primary unit of linear measure but on a scale on which said increments are of readily discernible size, the combination of a rotary indicator, a combined mechanical and electrical motion transmitting connection between said element and said indicator comprising a self-synchronous electrical transmitter having relatively rotatable inductively related primary and secondary members, a similar self-synchronous receiver electrically interconnected with said transmitter for rotation of its rotatable member in unison with the rotatable member of the transmitting device, means for directly connecting the rotatable member of said receiver in driving relation with said indicator, and mechanism for amplifying the motion of said movable element and applying the same to the rotatable member of said transmitter whereby said movable members revolve at a higher speed than any other elements of the system.

WILLIAM F. RIDGWAY.

CERTIFICATE OF CORRECTION.

Patent No. 2,257,764. October 7, 1941.

WILLIAM F. RIDGWAY.

It is hereby certified that error appears in the printed specification of the above numbered patent requiring correction as follows: Page 1, second column, line 43, for "able feed motor (not shown). Similarly, to trav-" read --able. For vertical feed of the saddle 28 on its--; and that the said Letters Patent should be read with this correction therein that the same may conform to the record of the case in the Patent Office.

Signed and sealed this 16th day of December, A. D. 1941.

(Seal)
Henry Van Arsdale,
Acting Commissioner of Patents.